(12) United States Patent
Watanabe et al.

(10) Patent No.: US 10,138,793 B2
(45) Date of Patent: Nov. 27, 2018

(54) EXHAUST GAS PURIFICATION SYSTEM AND METHOD FOR CONTROLLING THE SAME

(71) Applicant: Bosch Corporation, Tokyo (JP)

(72) Inventors: Masanori Watanabe, Saitama (JP); Takeshi Miyamoto, Saitama (JP); Fumiyasu Kurogi, Saitama (JP)

(73) Assignee: Bosch Corporation, Tokyo (JP)

( * ) Notice: Subject to any disclaimer, the term of this patent is extended or adjusted under 35 U.S.C. 154(b) by 158 days.

(21) Appl. No.: 14/813,514

(22) Filed: Jul. 30, 2015

(65) Prior Publication Data

US 2015/0369106 A1    Dec. 24, 2015

Related U.S. Application Data

(62) Division of application No. 13/997,885, filed as application No. PCT/JP2011/079582 on Dec. 21, 2011, now Pat. No. 9,212,582.

(30) Foreign Application Priority Data

Dec. 27, 2010  (JP) .................................. 2010-290257
Dec. 27, 2010  (JP) .................................. 2010-290259

(51) Int. Cl.
*F01N 3/00* (2006.01)
*F01N 3/02* (2006.01)
(Continued)

(52) U.S. Cl.
CPC ............... *F01N 11/00* (2013.01); *F01N 3/10* (2013.01); *F01N 3/208* (2013.01); *F01N 3/2066* (2013.01);
(Continued)

(58) Field of Classification Search
CPC ............. F01N 11/00; F01N 2430/00; F01N 2610/105; F01N 2900/1616; F01N 3/10; F01N 3/2066; F01N 3/208; Y02T 10/24
(Continued)

(56) References Cited

U.S. PATENT DOCUMENTS 5,884,475 A  *  3/1999  Hofmann ............... F01N 3/2066
                                                      60/274
6,363,771 B1 *  4/2002  Liang ................. B01D 53/9431
                                                      340/439

(Continued)

FOREIGN PATENT DOCUMENTS

CN          1863987      11/2006
CN          101248264     8/2008
(Continued)

OTHER PUBLICATIONS

International Search Report for Application No. PCT/JP2011/079582 dated Mar. 13, 2012 (1 page).

Primary Examiner — Phutthiwat Wongwian
Assistant Examiner — Diem Tran
(74) Attorney, Agent, or Firm — Michael Best & Friedrich LLP

(57) ABSTRACT

An exhaust gas purification system capable of preventing clogging of a reducing agent injection valve due to solidified urea aqueous solution to prevent a decrease in the exhaust gas purification efficiency of an internal-combustion engine. The exhaust gas purification system includes a diesel particulate filter, a reducing agent injection valve and an SCR catalyst in this order from the exhaust upstream side. A condition satisfaction determination section determines whether or not urea aqueous solution is likely to be solidified when detecting that an ignition switch is turned off, and an internal-combustion engine stop prevention section prevents the internal-combustion engine from being stopped, based on a determination by the condition satisfaction determination section.

8 Claims, 14 Drawing Sheets

(51) Int. Cl.
  *F01N 3/10*   (2006.01)
  *F01N 11/00*  (2006.01)
  *F01N 3/20*   (2006.01)

(52) U.S. Cl.
  CPC .... *F01N 2430/00* (2013.01); *F01N 2610/105* (2013.01); *F01N 2900/1616* (2013.01); *Y02T 10/24* (2013.01)

(58) Field of Classification Search
  USPC .......................... 60/277, 286, 301, 303, 311
  See application file for complete search history.

(56) References Cited

U.S. PATENT DOCUMENTS

| | | | |
|---|---|---|---|
| 6,513,323 B1* | 2/2003 | Weigl | F01N 3/2066 60/295 |
| 7,886,525 B2 | 2/2011 | Nishibu et al. | |
| 8,006,483 B2 | 8/2011 | Matsunaga et al. | |
| 8,069,649 B2 | 12/2011 | Matsunaga | |
| 2007/0079601 A1* | 4/2007 | Hirata | F01N 3/2066 60/286 |
| 2008/0236147 A1* | 10/2008 | Van Vuuren | F01N 3/2066 60/295 |
| 2010/0031639 A1 | 2/2010 | Kwon | |
| 2010/0071349 A1 | 3/2010 | Kitazawa | |
| 2010/0071351 A1 | 3/2010 | Nishimura et al. | |
| 2010/0205944 A1* | 8/2010 | Torisaka | F01N 13/009 60/297 |

FOREIGN PATENT DOCUMENTS

| | | |
|---|---|---|
| DE | 10164487 | 7/2003 |
| EP | 1331373 * | 7/2003 |
| JP | 2000329373 | 11/2000 |
| JP | 2007270634 | 10/2007 |
| JP | 2009215891 | 9/2009 |
| JP | 2010024896 | 2/2010 |

* cited by examiner 51, 52  PRESSURE SENSOR
63      FORCED REGENERATION CONTROL SECTION
57      IGNITION SWITCH
64      CONDITION SATISFACTION DETERMINATION SECTION
65      INTERNAL-COMBUSTION ENGINE STOP PREVENTION SECTION
53      TEMPERATURE SENSOR
62      TEMPERATURE DETECTION SECTION Tdpf  DPF DOWNSTREAM EXHAUST TEMPERATURE
Tudv  REDUCING AGENT INJECTION VALVE TEMPERATURE
T0    SOLIDIFICATION TEMPERATURE OF UREA AQUEOUS
      SOLUTION IN INJECTION VALVE S1  DETECT THAT IGNITION SWITCH IS TURNED OFF
S2  SOLIDIFICATION CONDITION SATISFIED?
S3  PREVENT INTERNAL-COMBUSTION ENGINE STOP
S4  ALLOW INTERNAL-COMBUSTION ENGINE STOP S21 DETECT THAT IGNITION SWITCH IS TURNED OFF
S22 DURING FORCED REGENERATION OR WITHIN PREDETERMINED PERIOD?
S23 PREVENT INTERNAL-COMBUSTION ENGINE STOP
S24 ALLOW INTERNAL-COMBUSTION ENGINE STOP S31 DETECT THAT IGNITION SWITCH IS TURNED OFF
S32 Tudv >Ts?
S33 PREVENT INTERNAL-COMBUSTION ENGINE STOP
S34 ALLOW INTERNAL-COMBUSTION ENGINE STOP Tdpf  DPF DOWNSTREAM EXHAUST TEMPERATURE
Tudv  REDUCING AGENT INJECTION VALVE TEMPERATURE
T0    SOLIDIFICATION TEMPERATURE OF UREA AQUEOUS SOLUTION IN INJECTION VALVE 51, 52 PRESSURE SENSOR
63   FORCED REGENERATION CONTROL SECTION
67   CONDITION SATISFACTION DETERMINATION SECTION
68   OPERATOR NOTIFICATION SECTION
53   TEMPERATURE SENSOR
62   TEMPERATURE DETECTION SECTION Tdpf  DPF DOWNSTREAM EXHAUST TEMPERATURE
Tudv  REDUCING AGENT INJECTION VALVE TEMPERATURE
T0    SOLIDIFICATION TEMPERATURE OF UREA AQUEOUS SOLUTION IN INJECTION VALVE S41  DETECT THAT IDLE STATE CONTINUES FOR PREDETERMINED TIME
S42  START DETERMINATION ASSUMING THAT INTERNAL-COMBUSTION ENGINE IS STOPPED
S43  SOLIDIFICATION CONDITION SATISFIED?
S44  NOTIFY OPERATOR
S45  NOT NOTIFY OPERATOR OR STOP NOTIFICATION S51  DETECT THAT IDLE STATE CONTINUES FOR PREDETERMINED TIME
S52  START DETERMINATION ASSUMING THAT INTERNAL-COMBUSTION ENGINE IS STOPPED
S53  DURING FORCED REGENERATION OR WITHIN PREDETERMINED PERIOD?
S54  NOTIFY OPERATOR
S55  NOT NOTIFY OPERATOR OR STOP NOTIFICATION S61 DETECT THAT IDLE STATE CONTINUES FOR PREDETERMINED TIME
S62 START DETERMINATION ASSUMING THAT INTERNAL-COMBUSTION ENGINE IS STOPPED
S63 Tudv > Ts?
S64 NOTIFY OPERATOR
S65 NOT NOTIFY OPERATOR OR STOP NOTIFICATION Tdpf  DPF DOWNSTREAM EXHAUST TEMPERATURE
Tudv  REDUCING AGENT INJECTION VALVE TEMPERATURE
T0    SOLIDIFICATION TEMPERATURE OF UREA AQUEOUS SOLUTION IN INJECTION VALVE

EXHAUST GAS PURIFICATION SYSTEM AND METHOD FOR CONTROLLING THE SAME

RELATED APPLICATION

The present application is a continuation of and claims priority to co-pending U.S. patent application Ser. No. 13/997,885, filed Jun. 25, 2013, the entire content of which is herein incorporated by reference.

BACKGROUND OF THE INVENTION

The present invention relates to an exhaust gas purification system and a method for controlling the same. More particularly, the invention relates to an exhaust gas purification system and a method for controlling the same capable of eliminating clogging of a reducing agent injection valve due to solidified urea aqueous solution.

Conventionally, exhaust gas of an internal-combustion engine included in a vehicle contains nitrogen oxides (hereinafter referred to as "$NO_x$") and particulate matter (hereinafter referred to as "PM"). Among them, $NO_x$ can be reduced to purify exhaust gas using, for example, a urea SCR system. The urea SCR system includes: a reducing agent supply apparatus for pumping urea aqueous solution as a reducing agent from a storage tank by a pump and supplying the urea aqueous solution from a reducing agent injection valve into an exhaust pipe; and SCR catalyst, a type of exhaust gas purification catalyst capable of adsorbing ammonia. The urea SCR system causes ammonia produced by decomposition of urea aqueous solution to be adsorbed to the SCR catalyst and causes NOx contained in exhaust gas to be reacted with the ammonia in the SCR catalyst, thereby purifying the exhaust gas.

On the other hand, PM can be collected to purify exhaust gas using, for example, a diesel particulate filter (hereinafter referred to as "DPF"). The DPF is placed in an exhaust pipe of an internal-combustion engine and, when exhaust gas passes through the DPF, the DPF collects PM contained in the exhaust gas. The exhaust gas purification system including the DPF performs forced regeneration control at appropriate times in order to prevent clogging of the DPF, in which the temperature of the DPF is increased to about 500-600° C. to force PM depositing on the DPF to be burnt. Recently, regulations for purifying exhaust gas has been tightened. With this trend, an exhaust gas purification systems including both the DPF and SCR catalyst has been increasingly used.

By the way, in general, the urea SCR system, when the internal-combustion engine is stopped, collects urea aqueous solution left in a reducing agent supply passage (e.g., see JP-A-2009-215891). This can prevent urea aqueous solution left in the reducing agent supply passage from getting frozen to cause clogging of the reducing agent supply passage.

SUMMARY OF THE INVENTION

However, the exhaust gas purification system described in JP-A-2009-215891 has a problem that, in the process of heating and then cooling urea aqueous solution in the reducing agent injection valve after the internal-combustion engine is stopped, the urea aqueous solution may be solidified to interfere with the supply of urea aqueous solution when the internal-combustion engine is started, thereby decreasing the exhaust gas purification efficiency.

Specifically, in the exhaust gas purification system, when the internal-combustion engine is stopped, purge process of collecting urea aqueous solution filling the reducing agent supply apparatus into the storage tank is generally performed, but the urea aqueous solution filling the reducing agent supply apparatus may not be completely collected into the storage tank due to the structure of a reducing agent passage connecting the storage tank to the reducing agent injection valve or the like reason. On the other hand, when the internal-combustion engine is stopped, the heat dissipation function of the reducing agent injection valve, such as circulation of cooling water, stops, causing the temperature of the reducing agent injection valve to increase. Then, water contained in the urea aqueous solution left in the reducing agent injection valve decreases due to evaporation, causing the concentration of the urea aqueous solution to increase. Then, the temperature of the urea aqueous solution decreases as the temperature of the exhaust pipe and the ambient temperature decrease, but, since the concentration has become higher than usual, the solidification temperature has also become higher, which may cause the urea aqueous solution to be solidified, thereby causing clogging of the reducing agent injection valve. The concentration of the urea aqueous solution is typically adjusted to about 32.5% at which the urea aqueous solution is solidified at about −11° C. When the concentration exceeds that percentage, the temperature at which the urea aqueous solution is solidified tends to increase (see FIG. 14). Accordingly, the urea aqueous solution left in the reducing agent injection valve with the concentration having increased by water evaporation due to the increased temperature is likely to be solidified when the temperature decreases, which may interfere with the injection of the reducing agent injection valve when the internal-combustion engine is restarted.

Thus, the present inventors found that the above-described problem can be solved by determining whether or not the urea aqueous solution having been heated is likely to be solidified when being cooled after the internal-combustion engine is stopped and, if determined that the urea aqueous solution is likely to be solidified, preventing the internal-combustion engine from being stopped, and thus completed the invention. That is, it is an object of the present invention to provide an exhaust gas purification system capable of preventing clogging of the reducing agent injection valve due to solidified urea aqueous solution and furthermore preventing decrease in the exhaust gas purification efficiency and a method for controlling the same.

According to the invention, in order to solve the above-described problem, an exhaust gas purification system is provided, the system including: a DPF for collecting exhaust particles contained in exhaust gas; a reducing agent injection valve for injecting urea aqueous solution as a reducing agent in the exhaust gas; and an SCR catalyst for using the urea aqueous solution to purify NOx contained in the exhaust gas, in this order from the exhaust upstream side, wherein the system includes: a condition satisfaction determination section for determining whether or not the urea aqueous solution is likely to be solidified when detecting that an ignition switch is turned off while an internal-combustion engine is operating; and an internal-combustion engine stop prevention section for preventing the internal-combustion engine from being stopped when determining that the urea aqueous solution is likely to be solidified. Accordingly, it is determined whether or not urea aqueous solution in the reducing agent injection valve is likely to be solidified, then, based on the determination, the internal-combustion engine is prevented from being stopped, allowing the circulation of cooling water to be continued, so solidification of urea aqueous solution can be avoided, and clogging of the reducing agent injection valve due to the solidification can be prevented, and furthermore, decrease in the exhaust gas purification efficiency can be prevented.

Furthermore, in configuring the invention, the condition satisfaction determination section preferably determines that the urea aqueous solution is likely to be solidified when detecting that the ignition switch is turned off in the period when forced regeneration of the DPF is started to when it is ended or within a predetermined period from when it is ended. As such, during forced regeneration of the DPF and within a predetermined period from when the forced regeneration is ended, the reducing agent injection valve downstream of the DPF is exposed to high temperature, and when the internal-combustion engine is stopped, its cooling function does not work effectively, causing the concentration of the urea aqueous solution left in the reducing agent injection valve to increase, so it may be determined that the solidification is likely to occur.

Furthermore, in configuring the invention, the condition satisfaction determination section preferably determines whether or not the urea aqueous solution is likely to be solidified when detecting that the ignition switch is turned off, based on at least one of the temperature, temperature gradient and outside-air temperature of the reducing agent injection valve. Whether or not the urea aqueous solution in the reducing agent injection valve is likely to be solidified depends on the temperature of the reducing agent injection valve, so the determination based on the temperature, temperature gradient and outside-air temperature of the reducing agent injection valve allows more accurate estimation of the likelihood of solidification of the urea aqueous solution.

Furthermore, another aspect of the invention is a method for controlling an exhaust gas purification system, the system including: a DPF for collecting exhaust particles contained in exhaust gas; a reducing agent injection valve for injecting urea aqueous solution as a reducing agent in the exhaust gas; and an SCR catalyst for using the urea aqueous solution to purify $NO_x$ contained in the exhaust gas, in this order from the exhaust upstream side, wherein the method includes the steps of: determining whether or not the urea aqueous solution is likely to be solidified when detecting that an ignition switch is turned off while an internal-combustion engine is operating; and preventing the internal-combustion engine from being stopped when determining that the urea aqueous solution is likely to be solidified. Accordingly, it is determined whether or not urea aqueous solution in the reducing agent injection valve is likely to be solidified, then, based on the determination, the internal-combustion engine is prevented from being stopped, allowing the circulation of cooling water to be continued, so solidification of urea aqueous solution can be avoided, and clogging of the reducing agent injection valve due to the solidification can be prevented, and furthermore, decrease in the exhaust gas purification efficiency can be prevented.

DETAILED DESCRIPTION

Embodiments of an exhaust gas purification system and a method for controlling the same in accordance with the invention are specifically described below with reference to the drawings. However, the embodiments described below are intended to show only an aspect of the invention and not intended to limit the invention, so may be appropriately modified within the scope of the invention. Note that, through the drawings, like numerals denote like components or parts, and duplicative descriptions will be appropriately omitted.

First Embodiment

1. Exhaust Gas Purification System
(1) Overall Configuration

Figure 1:
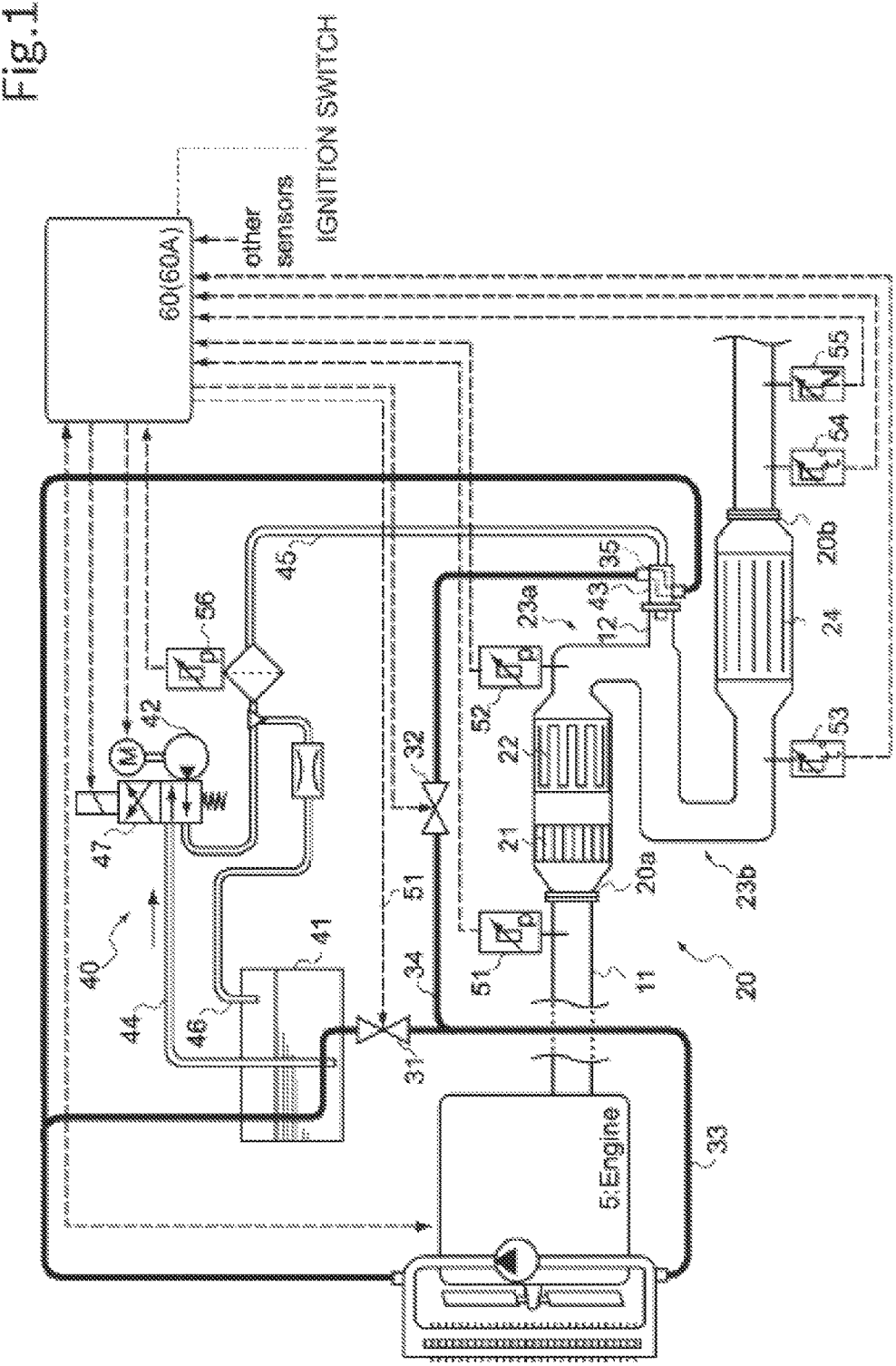
FIG. 1 is an overall diagram showing a configuration example of an exhaust gas purification system in accordance with an embodiment of the invention.

FIG. 1 shows an overall configuration of an exhaust gas purification system (hereinafter may be simply referred to as "system") 10 in accordance with a first embodiment of the invention. The system 10 includes as main components: an exhaust gas purification unit 20 having a DPF 22 and an SCR catalyst 24; a reducing agent supply apparatus 40 including a reducing agent injection valve 43; and a control unit 60 for performing forced regeneration control of the DPF 22 and operation control of the reducing agent supply apparatus 40. The system 10 is an apparatus configured so that the DPF 22 collects PM contained in exhaust gas and urea aqueous solution as a reducing agent is used to selectively purify NOx contained in exhaust gas in the SCR catalyst 24.

(2) Exhaust Gas Purification Unit

The exhaust gas purification unit 20 includes an oxidation catalyst 21, the DPF 22 and the SCR catalyst 24 in this order from the exhaust upstream side.

Among the components of the exhaust gas purification unit 20, the oxidation catalyst 21 oxidizes unburnt fuel supplied into an exhaust pipe 11 by post injection in an internal-combustion engine 5 to generate oxidation heat. This can cause the temperature of exhaust gas flowing into the DPF 22 to increase to heat the DPF 22. For the oxidation catalyst 21, a well-known material may be used, such as platinum-supported alumina with an additional predetermined amount of rare earth element (e.g., cerium).

The DPF 22, when exhaust gas passes through the DPF 22, collects PM contained in the exhaust gas. In the system 10 shown in FIG. 1, the DPF 22 is placed on the exhaust upstream side of the SCR catalyst 24, which prevents PM from being attached to the SCR catalyst 24. For the DPF 22, a well-known device may be used, such as a filter having a honeycomb structure formed of a ceramic material.

The SCR catalyst 24 adsorbs ammonia produced by decomposition of urea aqueous solution injected into exhaust gas by the reducing agent injection valve 43 to reduce NOx contained in the exhaust gas flowing into the SCR catalyst 24. For example, for the SCR catalyst 24, zeolite-type reducing agent capable of adsorbing ammonia and selectively reducing NOx may be used.

The above-described exhaust gas purification unit 20 includes pressure sensors 51, 52 on the exhaust upstream and downstream sides of the DPF 22, respectively, and temperature sensors 53, 54 on the exhaust upstream and downstream sides of the SCR catalyst 24, respectively. Furthermore, the exhaust gas purification unit 20 includes NOx sensor 55 on the exhaust downstream side of the SCR catalyst 24. Furthermore, an outside-air temperature sensor for detecting outside-air temperature is placed around the exhaust gas purification unit. The sensor values of these sensors are transmitted to the control unit 60 in which the pressures, temperatures and NOx concentrations at individual locations are detected. Note that if these pressures, temperatures and NOx concentrations can be estimated by calculation, these sensors may be omitted.

Furthermore, the above-described exhaust gas purification unit 20 includes a connecting pipe 12 that branches from a first bending part 23a of the exhaust pipe 11 to secure the reducing agent injection valve 43. Through this connecting pipe 12, urea aqueous solution is injected from the reducing agent injection valve 43 in almost the same direction as that of exhaust gas flow. This makes it difficult to transfer heat from the exhaust pipe 11, exhaust gas and the like to the reducing agent injection valve 43 in comparison with directly securing the reducing agent injection valve 43 to the exhaust pipe 11.

(3) Forced Regeneration Means

Note that the system 10 of the embodiment includes a forced regeneration means for performing forced regeneration control of the DPF 22. The forced regeneration means is intended to increase the temperature of the DPF 22 to about 500-600° C. and to force PM depositing on the DPF 22 to be burnt. In the embodiment, the forced regeneration means includes: a fuel injection valve (not shown) for supplying unburnt fuel into the exhaust pipe 11 by post injection in the internal-combustion engine 5; a controller of the control unit 60 for instructing control of the fuel injection valve, such as fuel injection amount or injection timing of the fuel injection valve or the like; and the oxidation catalyst 21 for oxidizing unburnt fuel to generate oxidation heat.

Note that the forced regeneration means is not limited to the above example, but other configurations capable of increasing the temperature of exhaust gas to about 500-600° C. may be used. For example, the forced regeneration means may be configured using an unit for supplying unburnt fuel to the oxidation catalyst 21 without post injection. Or the DPF 22 may also be directly heated with a heating unit such as a burner or heating wire.

(4) Reducing Agent Supply Apparatus

The reducing agent supply apparatus 40 includes as main components: a storage tank 41 for storing urea aqueous solution; a pump 42; and the reducing agent injection valve 43. Among them, the storage tank 41 is connected to the pump 42 by a first supply passage 44, and the pump 42 is connected to the reducing agent injection valve 43 by a second supply passage 45. The second supply passage 45 is provided with a pressure sensor 56 that transmits a sensor value to the control unit 60 that detects a pressure in the second supply passage 45. Furthermore, the second supply passage 45 is connected to the storage tank 41 by a third supply passage 46, allowing surplus urea aqueous solution supplied to the second supply passage 45 to be returned to the storage tank 41.

Furthermore, the reducing agent supply apparatus 40 is provided with a reverting valve 47 capable of switching the passage of urea aqueous solution from the forward direction (from the storage tank 41 to the reducing agent injection valve 43) to the reverse direction (from the reducing agent injection valve 43 to the storage tank 41). Accordingly, when the internal-combustion engine 5 is stopped, the system 10 of the embodiment can collect urea aqueous solution filling the reducing agent supply apparatus 40 into the storage tank 41.

Among the components of the reducing agent supply apparatus 40, the pump 42 pumps urea aqueous solution from the storage tank 41 to the reducing agent injection valve 43 so that the pressure in the second supply passage 45 is maintained at a predetermined pressure level. The pump 42 is typically an electric pump.

The reducing agent injection valve 43 injects urea aqueous solution in the exhaust pipe 11 when the reducing agent injection valve 43 opens in response to a control signal issued by the control processing unit 60. The reducing agent injection valve 43 is, for example, an on-off valve in which opening/closing of the valve is controlled by duty control.

An electronics part and resin part of the reducing agent injection valve 43 are relatively weak against heat, and their upper operating temperature limit TLim is about 140-150° C. On the other hand, the exhaust gas temperature during normal operation is about 200-300° C. As such, the reducing agent supply apparatus 40 includes: a cooling water passage 35 provided in the housing of the reducing agent injection valve 43; cooling water circulation passages 33, 34 branching from the cooling water passage 33 of the internal-combustion engine 5 and being in communication with the cooling water passage 35; and a cooling water flow control valve 31, 32 for adjusting the flow rate of cooling water flowing in the cooling water circulation passages 33, 34. This allows cooling water of the internal-combustion engine 5 to be circulated in the cooling water passage 35 of the reducing agent injection valve 43 to maintain the temperature of the reducing agent injection valve 43 at about 70-80° C., preventing the heat damage of the reducing agent injection valve 43. Furthermore, with the injection of reducing agent from the reducing agent injection valve 43, relatively low-temperature urea aqueous solution in the storage tank 41 is pumped to the reducing agent injection valve 43. Then, heat is transferred to this urea aqueous solution to facilitate the heat dissipation of the reducing agent injection valve 43.

This heat dissipation capability of the reducing agent injection valve 43 using the circulation of engine cooling water and heat transfer to urea aqueous solution as described above is effectively used especially when the internal-combustion engine 5 is operating. This is because the engine cooling water is circulated when the internal-combustion engine 5 is operating, and urea aqueous solution is pumped to the reducing agent injection valve 43 when the internal-combustion engine 5 is operating.

2. Control Unit (1) Overall Configuration

Figure 2:
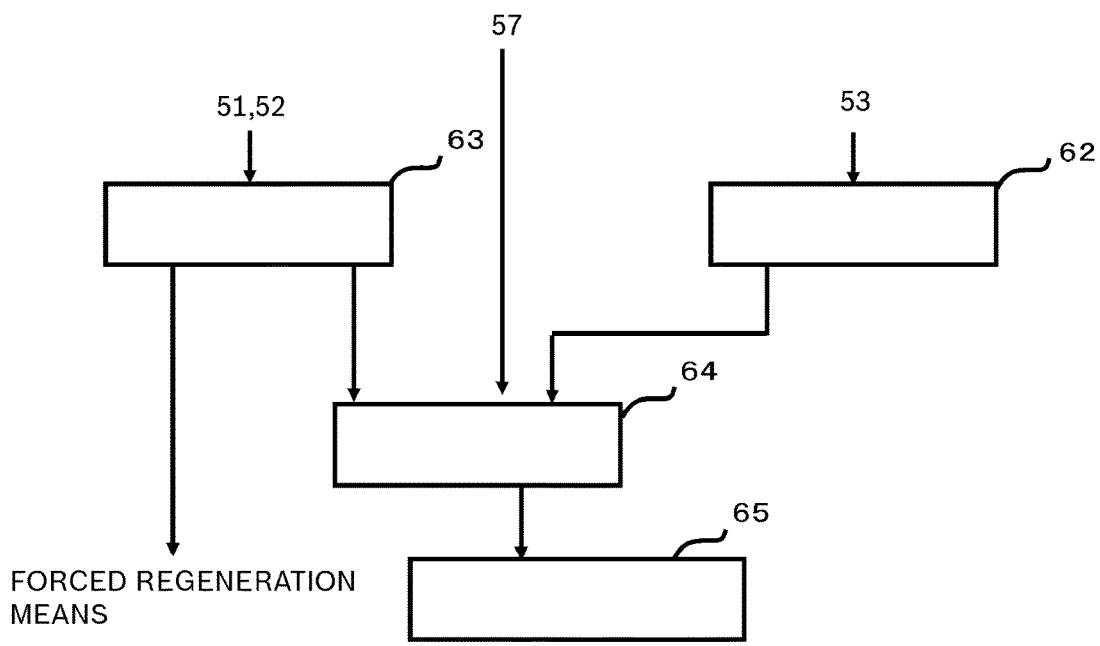
FIG. 2 is a block diagram showing a configuration example of a control unit included in the exhaust gas purification system in accordance with a first embodiment.

Next, with reference to FIG. 2, the control unit 60 included in the system 10 of the embodiment is specifically described, which can be roughly divided into four sections: a temperature detection section 62; a forced regeneration control section 63; a condition satisfaction determination section 64; and an internal-combustion engine stop prevention section 65. Practically, these sections are implemented by a program executed by microcomputer. Accordingly, FIG. 2 is a functional block diagram showing a configuration example of a part relating to control for eliminating clogging of the reducing agent injection valve 43 due to solidified urea aqueous solution, of the control unit 60 included in the system 10.

The control unit 60 can read a signal of an ignition switch 57 and various sensor signals of the pressure sensors, the temperature sensors, a rotation number sensor for detecting engine rotation number Ne, a vehicle speed sensor for detecting the speed V of a vehicle, an accelerator sensor for detecting the operation amount Acc of an accelerator pedal, a brake sensor for detecting the operation amount Brk of a brake pedal and the like. Furthermore, the control unit 60 includes a random access memory (RAM), not shown, for storing a calculation result and a detection result from the sections. Furthermore, the control unit 60 determines whether or not the operation of the internal-combustion engine is to be continued, on detecting a signal notifying that the ignition switch 57 is turned off.

While the internal-combustion engine 5 is operating, the control unit 60 controls the drive of the pump 42 so that the pressure in the second supply passage 45 is maintained at a predetermined level and controls the drive of the reducing agent injection valve 43 based on the engine rotation number Ne, the sensor value of an NOx sensor 55 provided on the exhaust downstream side of the SCR catalyst and the like. Furthermore, the control unit 60 performs purge process when the internal-combustion engine 5 is stopped. Specifically, the control unit 60 outputs to the reverting valve 47 a signal for switching the passage of urea aqueous solution from the forward direction to the reverse direction, and outputs to the pump 42 and the reducing agent injection valve 43 a signal for opening the reducing agent injection valve 43 and driving the pump 42.

(2) Temperature Detection Section

The temperature detection section 62 is intended to detect a reducing agent injection valve temperature Tudv. However, when Tudv cannot be directly detected, Tudv may be determined from a DPF 22 downstream side temperature Tdpf or the like in proximity to the reducing agent injection valve 43.

(3) Forced Regeneration Control Section

The forced regeneration control section 63 estimates PM deposition amount Vpm based on the pressure difference determined using the pressure sensors 51, 52 provided on the exhaust upstream and downstream sides of the DPF 22. Then, when the estimated PM deposition amount Vpm exceeds a predetermined threshold Vpm0, the forced regeneration control section 63 determines that forced regeneration of the DPF 22 is required, then transmits to the forced regeneration means a signal for performing forced regeneration. On the other hand, when the estimated PM deposition amount Vpm decreases to a predetermined amount, the forced regeneration control section 63 stops transmitting to the forced regeneration means the signal for performing forced regeneration. However, the method for determining when to perform forced regeneration of the DPF 22 is not limited to the method based on the pressure difference.

(4) Condition Satisfaction Determination Section

On detecting that the ignition switch 57 is turned off, the condition satisfaction determination section 64 determines whether or not urea aqueous solution in the reducing agent injection valve 43 is likely to be solidified. After the ignition switch 57 is turned off, when the internal-combustion engine 5 is stopped, the circulation of cooling water of the internal-combustion engine 5 also stops, so the heat dissipation capability of the reducing agent injection valve 43 is no longer effectively used, which increases the temperature of urea aqueous solution in the reducing agent injection valve 43 and accelerates evaporation of water contained in the urea aqueous solution. Then, the concentration of the urea aqueous solution increases, and accordingly, the solidification temperature T0 of the urea aqueous solution also increases. So, in the cooling process after the internal-combustion engine 5 is stopped, if determined that the temperature of the urea aqueous solution is below its solidification temperature T0, it is determined that the urea aqueous solution will be solidified.

As a more specific determination condition, if it is detected that the ignition switch 57 is turned off during forced regeneration of the DPF or within a predetermined period after forced regeneration, it may be determined that the urea aqueous solution is likely to be solidified. This is because, during or immediately after forced regeneration of the DPF, it may be determined that the exhaust downstream side of the DPF 22 is heated to a very high-temperature state, so the temperature of the reducing agent injection valve is likely to be high and increase in concentration of the urea aqueous solution causing the solidification is likely to occur. Note that the predetermined period is a period in which the effect of high temperature due to residual heat after forced regeneration reaches the reducing agent injection valve 43, which depends on the distance from the DPF 22 to the reducing agent injection valve 43, the heat capacity of the exhaust pipe and the like, so is preferably determined based on a result of an experiment using an actual equipment. Specifically, using the actual equipment, experiments are performed with various periods from when forced regeneration ends till when the internal-combustion engine 5 is stopped, then, for each of the individual periods, it is determined whether or not urea aqueous solution in the reducing agent injection valve 43 is solidified, from the result of which the predetermined period can be determined.

Figure 3:
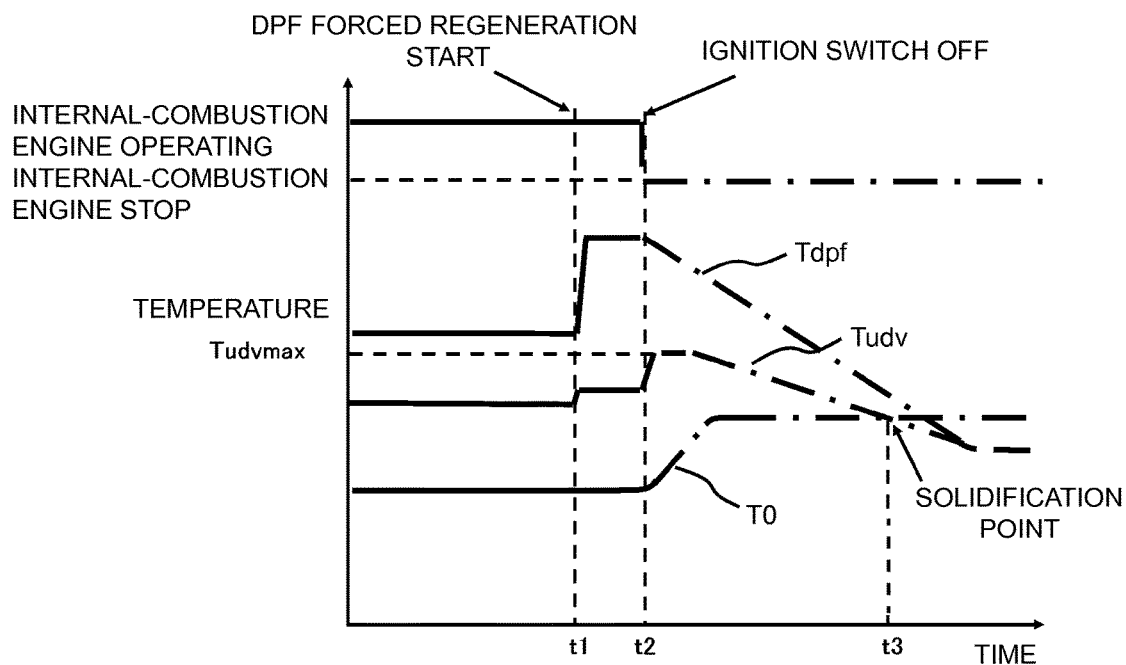
FIG. 3 is a timing chart for describing a method for controlling the exhaust gas purification system in accordance with the first embodiment.
Figure 7:
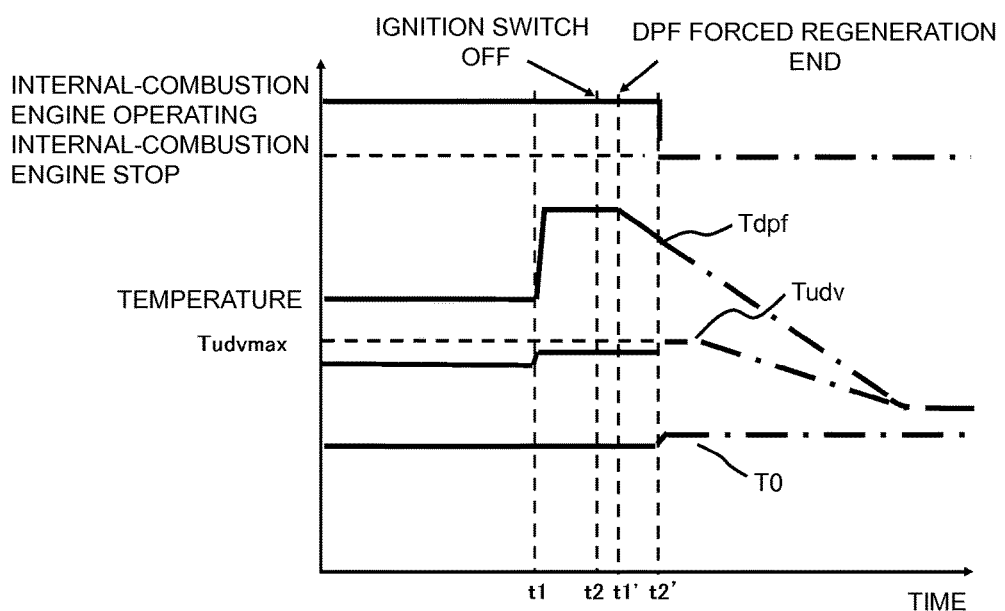
FIG. 7 is a timing chart for describing a method for controlling the exhaust gas purification system in accordance with the first embodiment.

As another determination condition, when it is detected that the ignition switch 57 is turned off, it is determined whether or not urea aqueous solution is likely to be solidified, based on the reducing agent injection valve temperature Tudv, a temperature gradient δTudv and an outside-air temperature Tout. This is because, when the reducing agent injection valve temperature Tudv is high, evaporation of water contained in the urea aqueous solution is accelerated, then the concentration increases, then the solidification temperature T0 increases, which increases the likelihood that the urea aqueous solution is solidified after cooling. Furthermore, when the temperature gradient δTudv of the reducing agent injection valve is large or when the outside-air temperature Tout is high, the likelihood that the urea aqueous solution is solidified similarly increases. So, the determination can be performed based on them or by appropriately combining them with the reducing agent injection valve temperature Tudv. Note that the reducing agent injection valve temperature Tudv to be used for the determination may be a temperature at that time or may be a temperature estimated to be reached. Or it may be a maximum reachable reducing agent injection valve temperature Tudvmax as shown in FIGS. 3 and 7. Preferably, experiments are performed using the actual equipment in various conditions of the reducing agent injection valve temperature Tudv, the temperature gradient δTudv and the outside-air temperature Tout, then, whether or not the urea aqueous solution in the reducing agent injection valve 43 is solidified is determined for each condition to determine specific determination criteria. Incidentally, when the reducing agent injection valve temperature Tudv exceeds about 100° C., the urea aqueous solution is more likely to be solidified in a subsequent cooling process.

(5) Internal-combustion Engine Stop Prevention Section

The internal-combustion engine stop prevention section 65 prevents the internal-combustion engine from being stopped if determined that stopping the internal-combustion engine may cause the urea aqueous solution to be solidified. When it is detected that the ignition switch 57 is turned off while the internal-combustion engine is operating, if it is determined that stopping the internal-combustion engine may cause the urea aqueous solution to be solidified in the cooling process after the stop, the internal-combustion engine stop prevention section 65 prevents the internal-combustion engine from being stopped. Then, the internal-combustion engine stop prevention section 65 continues the prevention until the urea aqueous solution becomes unlikely to be solidified, then allows the internal-combustion engine to be stopped.

3. Control Method

A specific example of a control method that can be implemented by the control unit 60 is described below with reference to timing charts and flowcharts.

Figure 4:
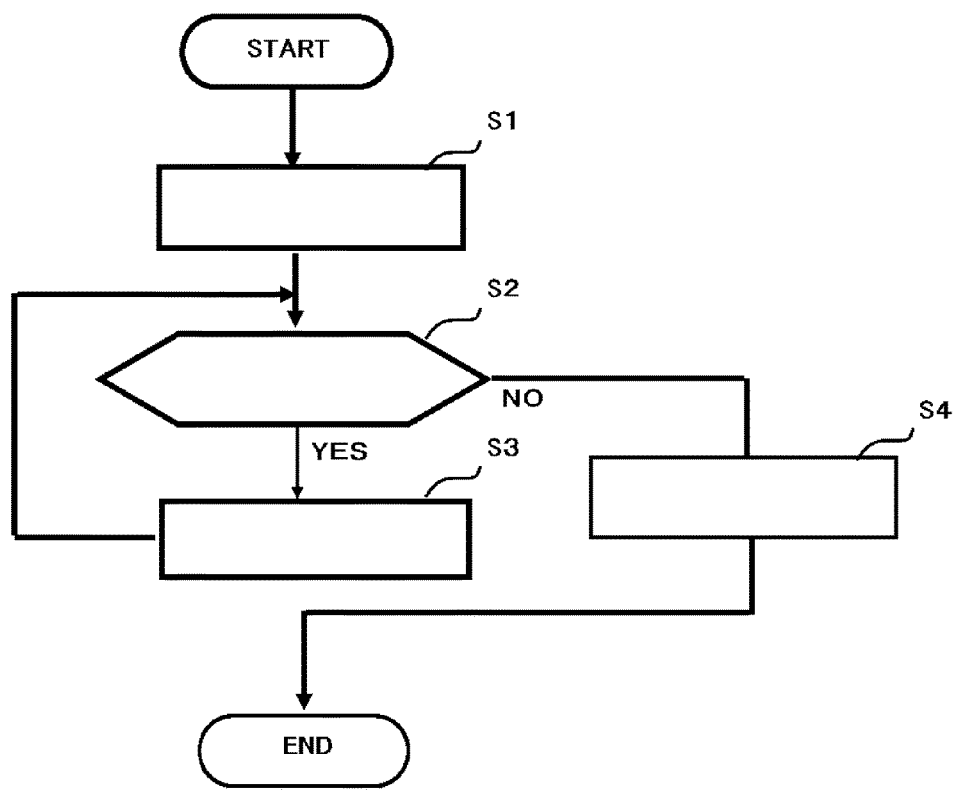
FIG. 4 is a flowchart for describing the method for controlling the exhaust gas purification system in accordance with the first embodiment.
Figure 5:
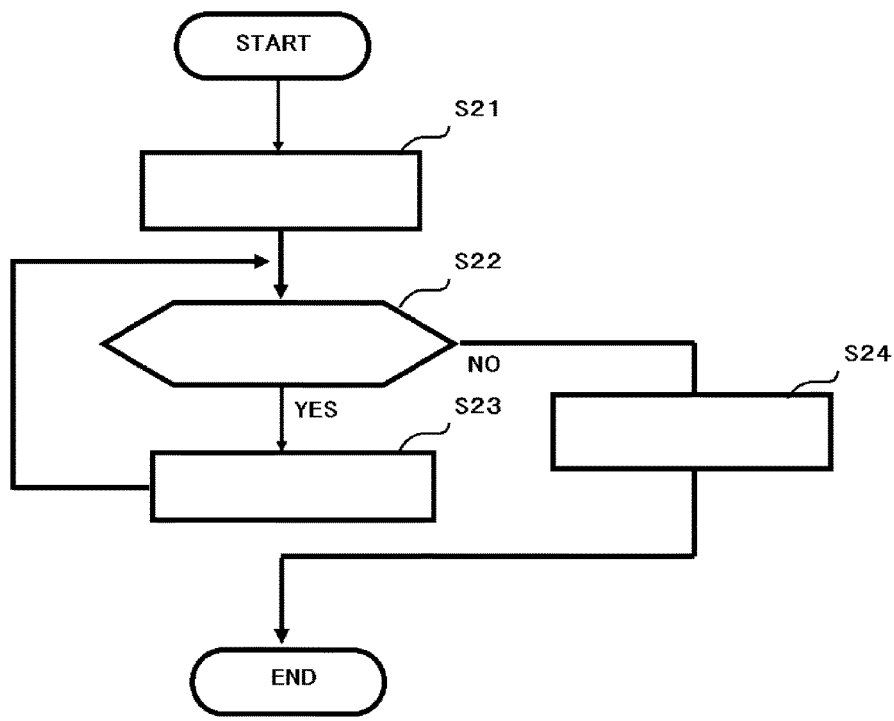
FIG. 5 is a flowchart for describing the method for controlling the exhaust gas purification system in accordance with the first embodiment.
Figure 6:
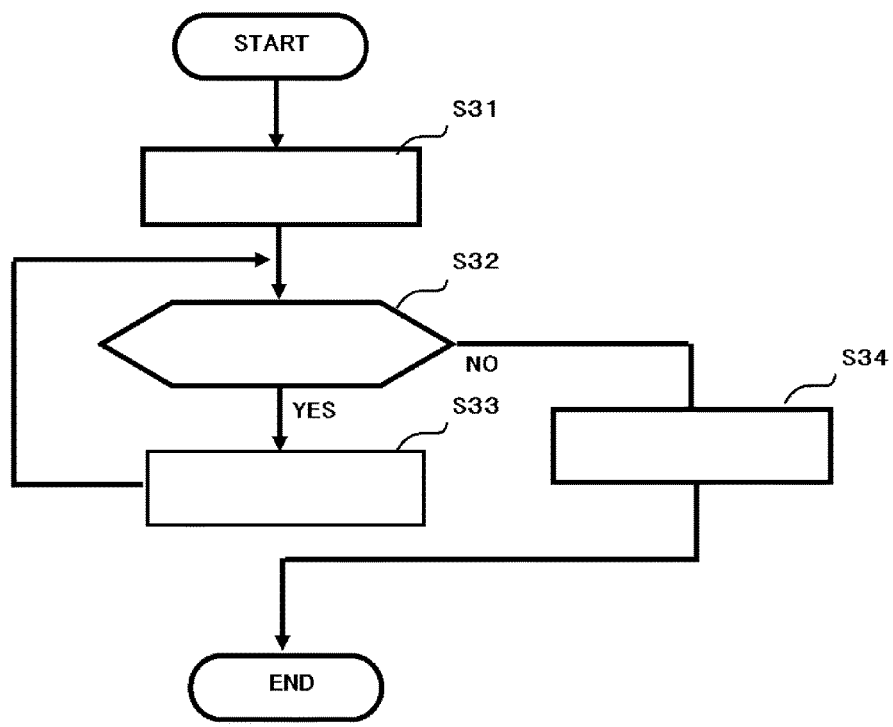
FIG. 6 is a flowchart for describing the method for controlling the exhaust gas purification system in accordance with the first embodiment.

FIGS. 3 and 7 are timing charts for describing the case where the ignition switch 57 is turned off during forced regeneration of the DPF 32, showing changes in the DPF downstream exhaust temperature Tdpf, the reducing agent injection valve temperature Tudv and the solidification temperature T0 of urea aqueous solution in the reducing agent injection valve 43, and the like. FIGS. 4-6 are flowcharts of a processing performed by the control unit 60 when it is detected that the ignition switch 57 is turned off.

First, when forced regeneration of the DPF 22 is started at t1 in FIG. 3, the DPF downstream exhaust temperature Tdpf increases due to regenerated heat of forced regeneration. The DPF downstream exhaust temperature Tdpf is typically about 200-300° C. when forced regeneration is not performed, but, when forced regeneration is started, the DPF downstream exhaust temperature Tdpf increases to about 500-600° C. Accordingly, the reducing agent injection valve temperature Tudv also increases. However, if the internal-combustion engine 5 is operating, engine cooling water is circulated in the cooling water passage 35 of the housing of the reducing agent injection valve 43 and relatively low-temperature urea aqueous solution in the storage tank 41 is pumped to the reducing agent injection valve 43, so the reducing agent injection valve temperature Tudv does not exceed a certain temperature, and increase in the concentration is small also due to newly supplied urea aqueous solution, resulting in a small change in the solidification temperature T0 of urea aqueous solution in the reducing agent injection valve 43.

In step S1 in FIG. 4, when the control unit 60 detects that the ignition switch 57 is turned off, it is determined in step S2 whether or not a solidification condition is satisfied. Specifically, when the internal-combustion engine 5 is assumed to be stopped by turning off the ignition switch 57, it is determined whether or not urea aqueous solution is likely to be solidified in the cooling process after the stop. A specific example of the determination method is described later with reference to FIGS. 5 and 6. If determined that urea aqueous solution is likely to be solidified, this routine proceeds to step S3 to prevent the internal-combustion engine from being stopped and returns to step S2. If determined that urea aqueous solution is not likely to be solidified, the routine proceeds to step S4 to allow the internal-combustion engine to be stopped and ends. Thus, the internal-combustion engine 5 is prevented from being stopped as far as it is likely to be solidified, and when it becomes unlikely to be solidified, the internal-combustion engine 5 is allowed to be stopped.

Returning to FIG. 3, the method for determining whether or not the solidification condition is satisfied is described in detail. At the time of t2 when it is detected that the ignition switch 57 is turned off, it is assumed that the internal-combustion engine 5 is stopped. Then, estimated changes in the temperatures from that time are shown by alternate long and short dash lines in FIG. 3. The DPF 22 exhaust downstream side temperature Tdpf gradually decreases. On the other hand, the circulation of cooling water of the internal-combustion engine 5 stops, so the heat dissipation capability of the reducing agent injection valve 43 is no longer effectively used. Then, after the time of t2, under the high DPF 22 exhaust downstream side temperature Tdpf, the reducing agent injection valve temperature Tudv increases and new urea aqueous solution is not supplied, so it is estimated that the concentration of the urea aqueous solution in the reducing agent injection valve 43 increases and the solidification temperature T0 of the urea aqueous solution also increases. Then, in the cooling process, if it is estimated that the reducing agent injection valve temperature Tudv is below the increased solidification temperature T0, it is determined that the urea aqueous solution in the reducing agent injection valve 43 is likely to be solidified. In FIG. 3, at the time of t3, the reducing agent injection valve temperature Tudv falls below the solidification temperature T0, then it is estimated that the urea aqueous solution in the reducing agent injection valve 43 starts to be solidified. Accordingly, in this case, it is determined that the urea aqueous solution in the reducing agent injection valve 43 is likely to be solidified, then the internal-combustion engine 5 is prevented from being stopped (step S3 in FIG. 4).

On the other hand, FIG. 7 shows a case where it is detected that the ignition switch 57 is turned off, then the internal-combustion engine 5 is prevented from being stopped and continues operating. Then, alternate long and short dash lines in FIG. 7 shows an estimation result of the reducing agent injection valve temperature Tudv and the like in the case where it is assumed that the internal-combustion engine 5 is stopped at the time of t2'. According to this, it is estimated that the reducing agent injection valve temperature Tudv never falls below the solidification temperature T0 of the urea aqueous solution. Accordingly, the urea aqueous solution is not likely to be solidified even if the internal-combustion engine 5 is stopped, so the internal-combustion engine 5 is allowed to be stopped (step S4 in FIG. 4).

FIG. 5 is a flowchart in which one specific method for determining whether or not the solidification condition is satisfied is included in the routine shown in FIG. 4. In step S21, when the control unit 60 detects that the ignition switch 57 is turned off, it is determined in step S22 whether or not it is during forced regeneration of the DPF 22 or within a predetermined period after the forced regeneration. If determined that it is during forced regeneration of the DPF 22 or within the predetermined period after the forced regeneration, this routine proceeds to step S23 to prevent the internal-combustion engine from being stopped and returns to step S22. On the other hand, if determined that it is not during forced regeneration of the DPF 22 nor within the predetermined period after the forced regeneration, the routine proceeds to step S24 to allow the internal-combustion engine to be stopped and ends. Thus, the internal-combustion engine 5 is prevented from being stopped within the predetermined period after the forced regeneration, then when the predetermined period elapses, the internal-combustion engine 5 is allowed to be stopped.

Furthermore, FIG. 6 is a flowchart in which another specific method than that of FIG. 5 for determining whether or not the solidification condition is satisfied is included. In step S31, when the control unit 60 detects that the ignition switch 57 is turned off, it is determined in step S32 whether or not the reducing agent injection valve temperature Tudv is higher than a threshold Ts. If determined that the reducing agent injection valve temperature Tudv is equal to or higher than the threshold Ts, the routine proceeds to step S33 to prevent the internal-combustion engine to be stopped and ends. If determined that the reducing agent injection valve temperature Tudv is lower than the threshold Ts, the routine proceeds to step S34 to allow the internal-combustion engine to be stopped and ends. Thus, the internal-combustion engine 5 is prevented from being stopped as far as the reducing agent injection valve temperature Tudv is lower than the threshold Ts, and when the reducing agent injection valve temperature Tudv is lower than the threshold Ts, the internal-combustion engine 5 is allowed to be stopped. Note that the reducing agent injection valve temperature Tudv may be a temperature at that time or may be a temperature estimated to be reached. Or it may be a maximum reachable reducing agent injection valve temperature Tudvmax as shown in FIGS. 3 and 7. Note that the threshold Ts is about 100° C.

According to the exhaust gas purification system and the method for controlling the same of the first embodiment, when it is detected that the ignition switch 57 is turned off, it is determined whether or not urea aqueous solution left in the reducing agent injection valve 43 is likely to be solidified in the cooling process after the internal-combustion engine 5 is stopped, then if determined that the urea aqueous solution is likely to be solidified, the internal-combustion engine 5 is prevented from being stopped, which can prevent the urea aqueous solution from being solidified. Thus, decrease in the exhaust gas purification efficiency due to solidified urea aqueous solution can be prevented.

Second Embodiment

According to an exhaust gas purification system and a method for controlling the same in accordance with a second embodiment of the invention, when the internal-combustion engine is stopped or when it is assumed that the internal-combustion engine is stopped while the internal-combustion engine is operating, if it is determined that urea aqueous solution is likely to be solidified, an operator of the internal-combustion engine is prompted to restart the internal-combustion engine or not to stop the internal-combustion engine.

The exhaust gas purification system in accordance with this embodiment basically has a configuration similar to that of the exhaust gas purification system in accordance with the first embodiment (see FIG. 1), but its control unit provides a function and control contents different from that of the exhaust gas purification system in accordance with the first embodiment. Then, with reference to FIG. 1 and FIGS. 8-13, the control unit included in the exhaust gas purification system of the embodiment and the control method performed by the control unit is described below, focusing on the difference from the first embodiment.

1. Control Unit

Figure 8:
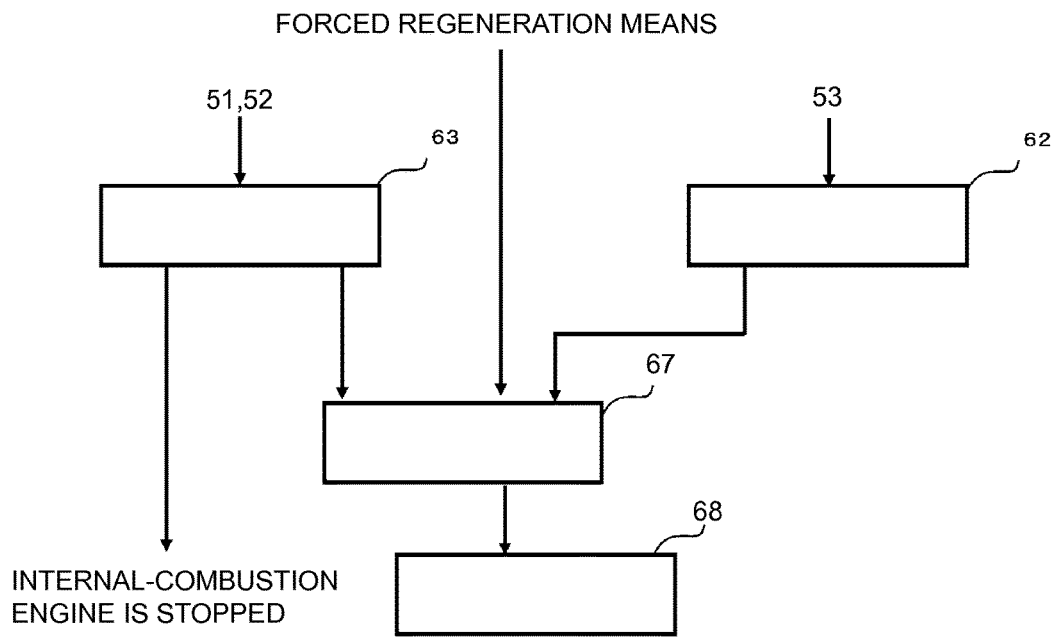
FIG. 8 is a block diagram showing a configuration example of a control unit included in an exhaust gas purification system in accordance with a second embodiment.

FIG. 8 is a functional block diagram showing a configuration example of a part relating to control for preventing clogging of the reducing agent injection valve 43, of the configuration of a control unit 60A included in the exhaust gas purification system of the invention. The control unit 60A includes the temperature detection section 62, the forced regeneration control section 63, a condition satisfaction determination section 67 and an operator notification section 68. Practically, these sections are implemented by a program executed by microcomputer.

The control unit 60A can read various sensor signals of the pressure sensors, the temperature sensors, the rotation number sensor for detecting engine rotation number Ne, the vehicle speed sensor for detecting the speed V of a vehicle, the accelerator sensor for detecting the operation amount Acc of an accelerator pedal, the brake sensor for detecting the operation amount Brk of a brake pedal and the like. Furthermore, the control unit 60A includes a random access memory (RAM), not shown, for storing a calculation result and a detection result from the sections.

While the internal-combustion engine 5 is operating, the control unit 60A controls the drive of the pump 42 so that the pressure in the second supply passage 45 is maintained at a predetermined level and controls the drive of the reducing agent injection valve 43 based on the engine rotation number Ne, the sensor value of an NOx sensor 55 provided on the exhaust downstream side of the SCR catalyst and the like. Furthermore, the control unit 60A performs purge process when the internal-combustion engine 5 is stopped. Specifically, the control unit 60A outputs to the reverting valve 47 a signal for switching the passage of urea aqueous solution from the forward direction to the reverse direction, and outputs to the pump 42 and the reducing agent injection valve 43 a signal for opening the reducing agent injection valve 43 and driving the pump 42. Note that, even after the internal-combustion engine 5 is stopped, the control unit 60A is configured to be capable of performing a function that is necessary for the system 10 of the embodiment.

Among them, the temperature detection section 62 and the forced regeneration control section 63 can be configured similarly to those of the first embodiment.

The condition satisfaction determination section 67, when the internal-combustion engine 5 is stopped or when it is assumed that the internal-combustion engine is stopped while the internal-combustion engine is operating, determines after the stop whether or not urea aqueous solution in the reducing agent injection valve 43 is likely to be solidified. Specific determination condition may be similar to that of the first embodiment. Note that, in assuming that the internal-combustion engine 5 is stopped while the internal-combustion engine 5 is operating and performing the determination, the assumption and determination may be performed continuously while the internal-combustion engine 5 is operating or may be performed when a predetermined time elapses while the internal-combustion engine 5 is in idle state.

If it is determined that the urea aqueous solution is likely to be solidified, the operator notification section 68 notifies an operator of the internal-combustion engine. In one example, when it is assumed that the internal-combustion engine 5 is stopped while the internal-combustion engine 5 is operating, if it is determined that the urea aqueous solution is likely to be solidified after the stop, the operator notification section 68 notifies the operator not to stop the internal-combustion engine. In another example, when the internal-combustion engine is stopped, if it is determined that the urea aqueous solution is likely to be solidified after the stop, the operator notification section 68 notifies the operator to restart the internal-combustion engine. Various notification methods are possible. For example, a warning lamp placed in plain view of the operator may be lit or the operator may be given the notification by voice.

2. Control Method

A specific example of a control method that can be implemented by the control unit 60A is described below with reference to timing charts and flowcharts.

Figure 9:
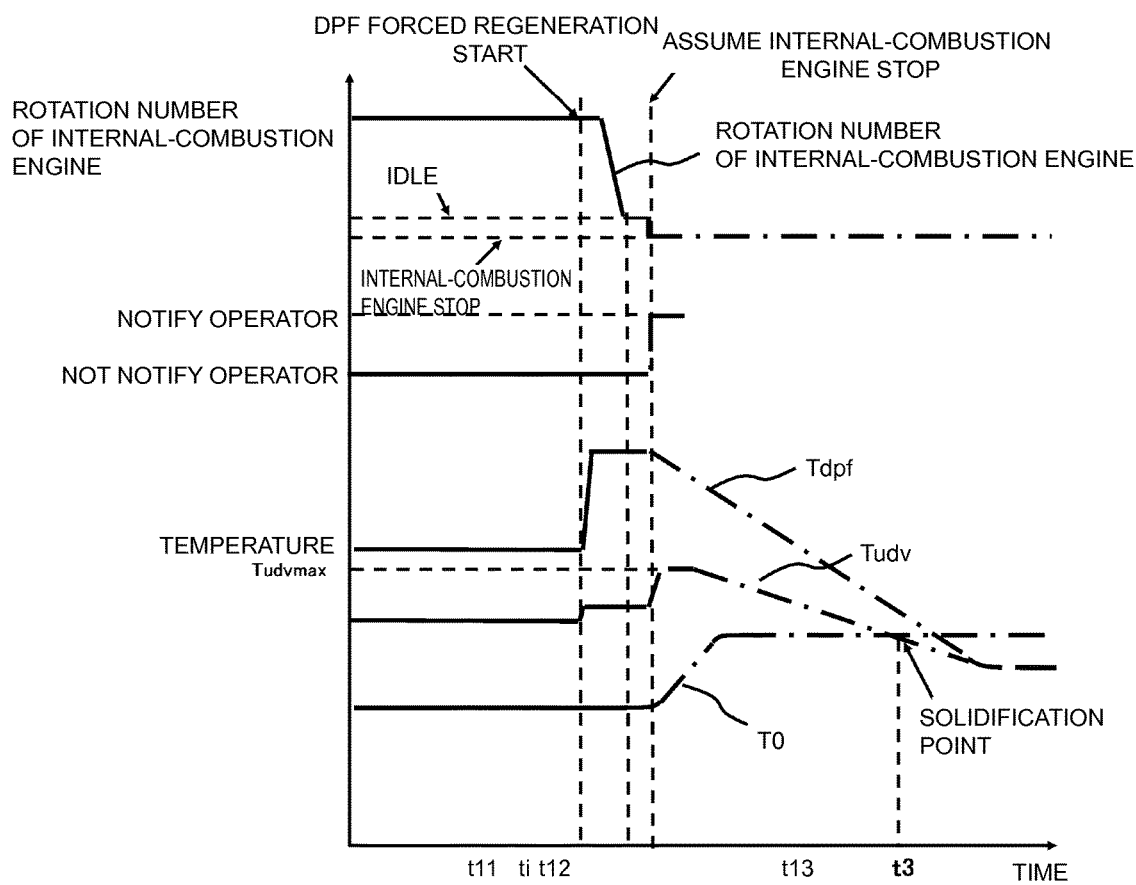
FIG. 9 is a timing chart for describing a method for controlling the exhaust gas purification system in accordance with the second embodiment.
Figure 10:
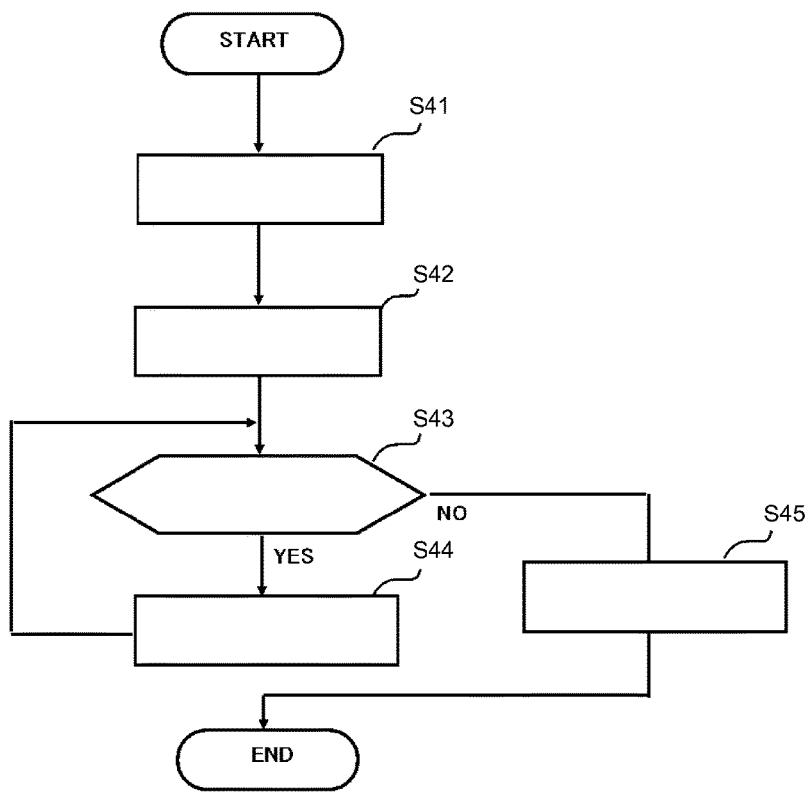
FIG. 10 is a flowchart for describing the method for controlling the exhaust gas purification system in accordance with the second embodiment.
Figure 13:
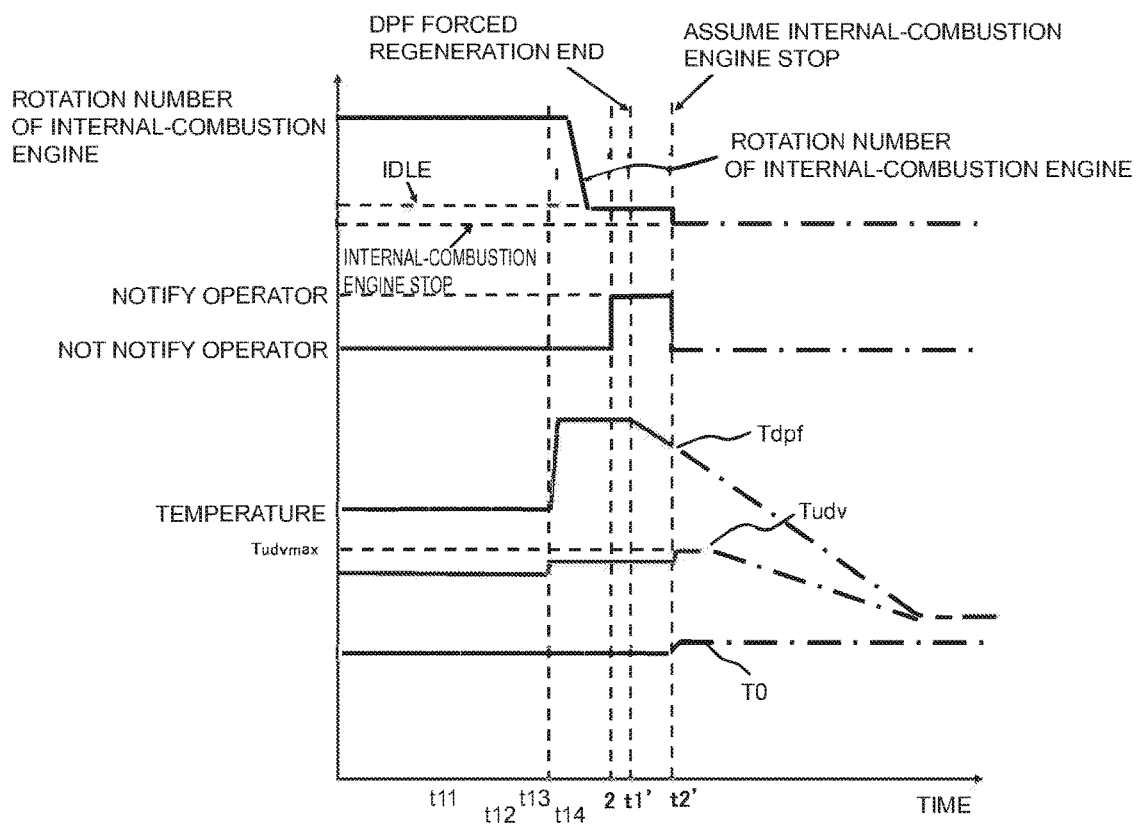
FIG. 13 is a timing chart for describing the method for controlling the exhaust gas purification system in accordance with the second embodiment.
Figure 14:
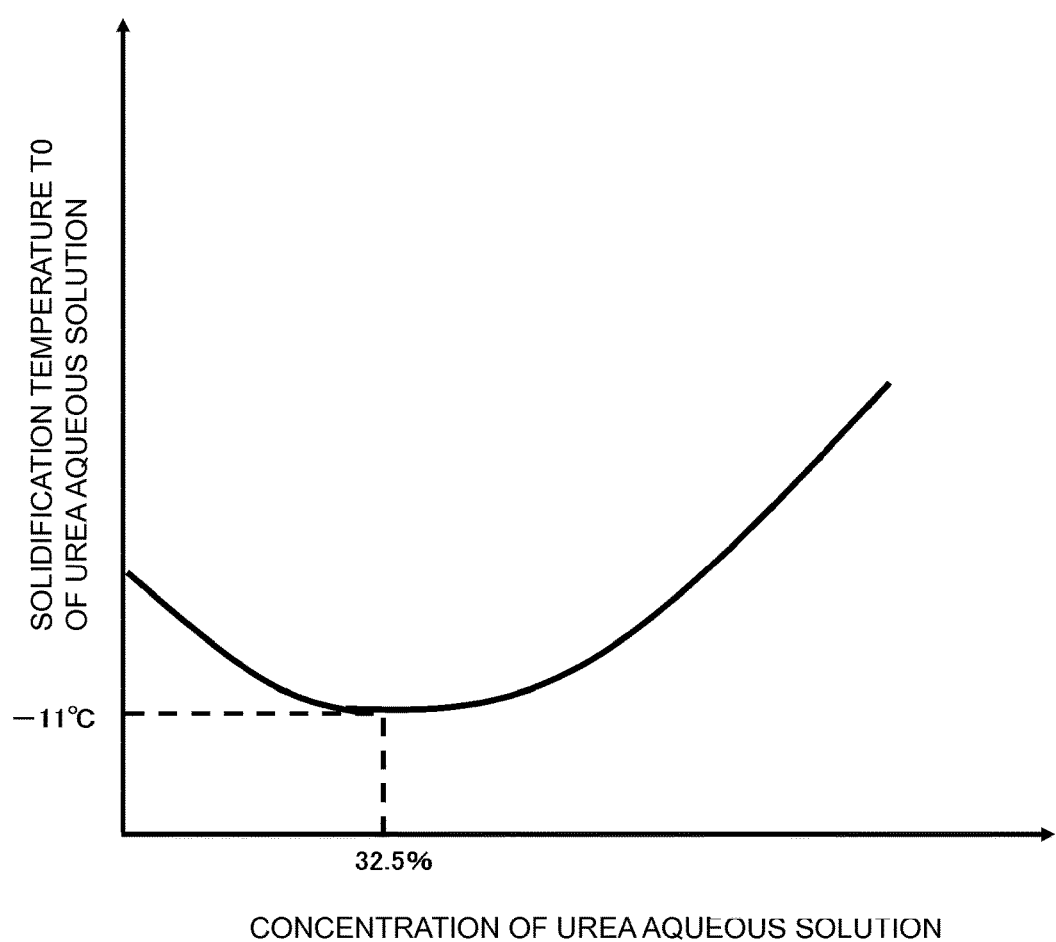
FIG. 14 is a graph showing the relation between the concentration of urea aqueous solution and the solidification temperature T0.

FIGS. 9 and 13 are timing charts showing changes in the DPF downstream exhaust temperature Tdpf, the reducing agent injection valve temperature Tudv, the solidification temperature T0 of urea aqueous solution in the reducing agent injection valve 43 and the like. FIG. 10 is a flowchart of a processing performed by the control unit 60A when it is assumed that the internal-combustion engine 5 is stopped while the internal-combustion engine 5 is operating.

First, when forced regeneration of the DPF 22 is started at t11 in FIG. 9, the DPF downstream exhaust temperature Tdpf increases due to regenerated heat of forced regeneration. The DPF downstream exhaust temperature Tdpf is typically about 200-300° C. when forced regeneration is not performed, but, when forced regeneration is started, the DPF downstream exhaust temperature Tdpf increases to about 500-600° C. Accordingly, the reducing agent injection valve temperature Tudv also increases. However, if the internal-combustion engine 5 is operating, engine cooling water is circulated in the cooling water passage 35 of the housing of the reducing agent injection valve 43 and relatively low-temperature urea aqueous solution in the storage tank 41 is pumped to the reducing agent injection valve 43, so the reducing agent injection valve temperature Tudv does not exceed a certain temperature, and increase in the concentration is small also due to newly supplied urea aqueous solution, resulting in a small change in the solidification temperature T0 of urea aqueous solution in the reducing agent injection valve 43.

When the rotation number of the internal-combustion engine 5 decreases and then the internal-combustion engine 5 becomes in idle state at the time of ti and then a predetermined time elapses in the idle state, this situation is detected in step S41 in FIG. 10, then in step S42, the determination assuming that the internal-combustion engine 5 is stopped, is started. Then, it is determined in step S43 whether or not the solidification condition is satisfied. Specifically, it is determined whether or not the urea aqueous solution is likely to be solidified in the cooling process after the internal-combustion engine 5 is stopped. A specific example of the determination method is described later with reference to FIGS. 11 and 12. If determined that the urea aqueous solution is likely to be solidified, this routine proceeds to step S44 to notify the operator of the internal-combustion engine and returns to step S43. On the other hand, if determined that the urea aqueous solution is not likely to be solidified, this routine proceeds to step S45 not to notify the operator and ends. Accordingly, in the embodiment, the notification to the operator is continued as far as the urea aqueous solution is likely to be solidified, then, when the urea aqueous solution becomes unlikely to be solidified, the notification to the operator is ended.

Returning to FIG. 9, the method for determining whether or not the solidification condition is satisfied is described in detail. At the time of t12 when it is assumed that the internal-combustion engine 5 is stopped, estimated changes in the temperatures from that time are shown by alternate long and short dash lines in FIG. 9. The DPF 22 exhaust downstream side temperature Tdpf gradually decreases. On the other hand, the circulation of cooling water of the internal-combustion engine 5 stops, so the heat dissipation capability of the reducing agent injection valve 43 is no longer effectively used. Then, after the time of t12, under the high DPF 22 exhaust downstream side temperature Tdpf, the reducing agent injection valve temperature Tudv increases and new urea aqueous solution is not supplied, so it is estimated that the concentration of the urea aqueous solution in the reducing agent injection valve 43 increases and the solidification temperature T0 of the urea aqueous solution also increases. Then, in the cooling process, if it is estimated that the reducing agent injection valve temperature Tudv is below the increased solidification temperature T0, it is determined that the urea aqueous solution in the reducing agent injection valve 43 is likely to be solidified. In FIG. 9, at the time of t13, the reducing agent injection valve temperature Tudv falls below the solidification temperature T0, then it is estimated that the urea aqueous solution in the reducing agent injection valve 43 starts to be solidified. Accordingly, it is determined at the time of t12 that the urea aqueous solution in the reducing agent injection valve 43 is likely to be solidified, then the operator is notified (step S44 in FIG. 10).

On the other hand, FIG. 13 shows a case where, when it is assumed at the time of t12 that the internal-combustion engine 5 is stopped, it is determined that the urea aqueous solution is likely to be solidified (step S43 in FIG. 10), then the operator is notified (step S44 in FIG. 10), then the operator does not stop the internal-combustion engine according to the notification, then forced regeneration of the DPF 22 ends at the time of t13, then the DPF 22 exhaust downstream side temperature Tdpf gradually decreases, and then the time of t14 is reached. Estimated changes in the temperatures from the time of t14 are shown by alternate long and short dash lines in FIG. 13. According to this estimation, increase in the reducing agent injection valve temperature Tudv is small, then accordingly, increase in the concentration of the urea aqueous solution in the reducing agent injection valve 43 is also small, and also, the reducing agent injection valve temperature Tudv does not fall below the solidification temperature T0 of the urea aqueous solution in the cooling process. In this case, the urea aqueous solution is no longer likely to be solidified even if the internal-combustion engine 5 is stopped, so the notification to the operator is also ended at the time of t14 (step S45 of FIG. 10).

Figure 11:
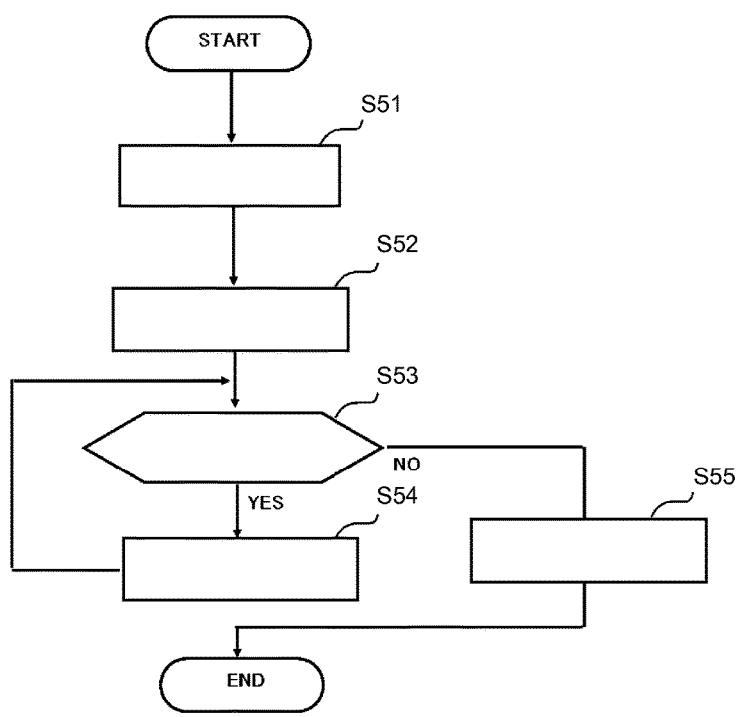
FIG. 11 is a flowchart for describing the method for controlling the exhaust gas purification system in accordance with the second embodiment.

FIG. 11 is a flowchart in which one specific method for determining whether or not the solidification condition is satisfied is included in the routine shown in FIG. 10. In step S51, when the internal-combustion engine 5 becomes in idle state and then the idle state continues for a predetermined time, then in step S52, the determination assuming that the internal-combustion engine 5 is stopped is started. Then, it is determined in step S53 whether or not it is during forced regeneration of the DPF 22 or within a predetermined period after the forced regeneration. If determined that it is during forced regeneration of the DPF 22 or within the predetermined period after the forced regeneration, this routine proceeds to step S54 to notify the operator of the internal-combustion engine and returns to step S53. On the other hand, if determined that it is not during forced regeneration of the DPF 22 nor within the predetermined period after the forced regeneration, the routine proceeds to step S55 not to notify the operator and ends. Accordingly, in the embodiment, the notification to the operator is continued as far as it is within the predetermined period after the forced regeneration, the urea aqueous solution is likely to be solidified, then, when the urea aqueous solution becomes unlikely to be solidified, the notification to the operator is ended.

Figure 12:
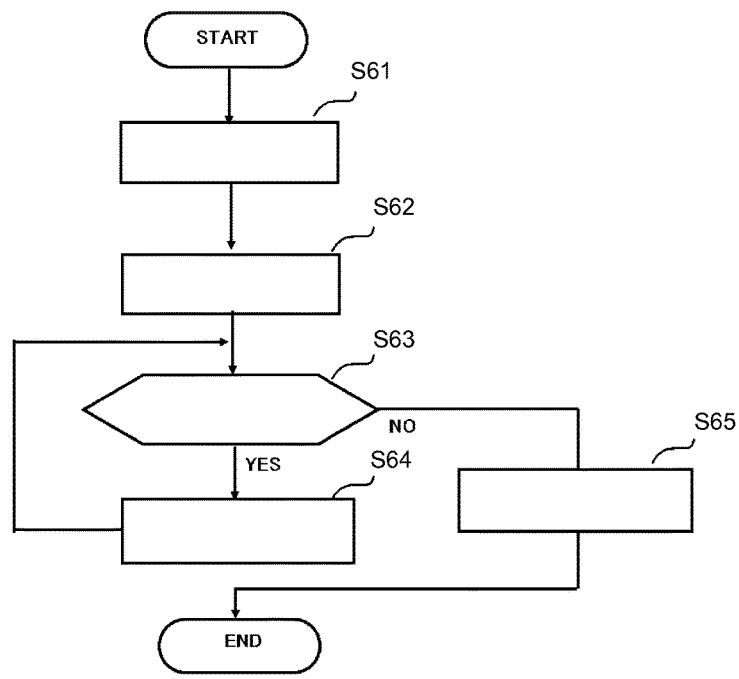
FIG. 12 is a flowchart for describing the method for controlling the exhaust gas purification system in accordance with the second embodiment.

Furthermore, FIG. 12 is a flowchart in which another specific method than that of FIG. 11 for determining whether or not the solidification condition is satisfied is included. In step S61, when it is detected that the internal-combustion engine 5 becomes in idle state and then the idle state continues for a predetermined time, then in step S62, the control unit 60A starts the determination assuming that the internal-combustion engine 5 is stopped. Then, it is determined in step S63 whether or not the reducing agent injection valve temperature Tudv is higher than the threshold temperature Ts. If determined that the reducing agent injection valve temperature Tudv is equal to or higher than the threshold temperature Ts, this routine proceeds to step S64 to notify the operator of the internal-combustion engine and returns to step S63. On the other hand, if determined that the reducing agent injection valve temperature Tudv is lower than the threshold temperature Ts, this routine proceeds to step S65 not to notify the operator and ends. Accordingly, in the embodiment, the notification to the operator is continued as far as the reducing agent injection valve temperature Tudv is lower than the threshold temperature Ts, then, when the reducing agent injection valve temperature Tudv becomes lower than the threshold temperature Ts, the notification to the operator is ended. Note that the reducing agent injection valve temperature Tudv may be a temperature at that time or may be a temperature estimated to be reached. Or it may be a maximum reachable reducing agent injection valve temperature Tudvmax as shown in FIGS. 9 and 13. Note that the threshold temperature Ts is about 100° C.

In the above-described control method, the determination assuming that the internal-combustion engine 5 is stopped is started when it is detected that the idle state of the internal-combustion engine 5 continues for the predetermined period. However, the determination assuming that the internal-combustion engine 5 is stopped may be started continuously while the internal-combustion engine 5 is operating. Or it may also be appropriate that, when the internal-combustion engine 5 actually stops, it is determined whether or not the solidification is likely to occur and, based on the determination, the operator is notified to restart the internal-combustion engine 5.

According to the exhaust gas purification system and the method for controlling the same of the second embodiment, it is determined whether or not urea aqueous solution left in the reducing agent injection valve 43 is likely to be solidified in the cooling process after the internal-combustion engine 5 is stopped, then if determined that the urea aqueous solution is likely to be solidified, the operator is notified, which can prevent the urea aqueous solution from being solidified. Thus, decrease in the exhaust gas purification efficiency due to solidified urea aqueous solution can be prevented.

Note that, the second embodiment is described as an embodiment different from the first embodiment, however the first and second embodiments may also be combined to be implemented.

What is claimed is:

1. An exhaust gas purification system comprising:
   a diesel particulate filter (DPF) for collecting exhaust particles contained in exhaust gas to be exhausted;
   a reducing agent injection valve for injecting urea aqueous solution as a reducing agent in the exhaust gas;
   a selective catalytic reduction (SCR) catalyst for using the urea aqueous solution to purify nitrogen oxides (NOx) contained in the exhaust gas, in this order from the exhaust upstream side; and an engine controller including a microcomputer configured to:
   predict whether or not the urea aqueous solution will be solidified when it is assumed that an internal-combustion engine is stopped in a period from when forced regeneration of the DPF is started to when it is ended or within a predetermined period from when it is ended and notify an operator of the internal-combustion engine when predicting that the urea aqueous solution will be solidified.

2. The exhaust gas purification system according to claim 1, wherein the engine controller predicts that the urea aqueous solution will be solidified after the internal-combustion engine is stopped, or when the internal-combustion engine is stopped.

3. The exhaust gas purification system according to claim 1, wherein the engine controller is configured to predict whether or not the urea aqueous solution will be solidified when it is assumed that the internal-combustion engine is stopped in a period from when forced regeneration of the DPF is started to when it is ended or within a predetermined period from when it is ended based on at least one of the group consisting of a temperature, temperature gradient and outside-air temperature of the reducing agent injection valve.

4. A method for controlling an exhaust gas purification system including a diesel particulate filter (DPF) for collecting exhaust particles contained in exhaust gas; a reducing agent injection valve for injecting urea aqueous solution as a reducing agent in the exhaust gas; an SCR catalyst for using the urea aqueous solution to purify NOx contained in the exhaust gas, in this order from the exhaust upstream side, and an engine controller, the method comprising:
   predicting whether or not the urea aqueous solution will be solidified when it is assumed that the internal-combustion engine is stopped in a period from when forced regeneration of the DPF is started to when it is ended or within a predetermined period from when it is ended; and notifying an operator of the internal-combustion engine when predicting that the urea aqueous solution will be solidified.

5. The method according to claim 4, wherein the engine controller is configured to predict whether or not the urea aqueous solution will be solidified when it is assumed that the internal-combustion engine is stopped in a period from when forced regeneration of the DPF is started to when it is ended or within a predetermined period from when it is ended based on at least one of the group consisting of a temperature, temperature gradient and outside-air temperature of the reducing agent injection valve.

6. A method for controlling an exhaust gas purification system including a diesel particulate filter (DPF) for collecting exhaust particles contained in exhaust gas; a reducing agent injection valve for injecting urea aqueous solution as a reducing agent in the exhaust gas; an SCR catalyst for using the urea aqueous solution to purify NOx contained in the exhaust gas, in this order from the exhaust upstream side, a cooling water passage provided in the housing of the reducing agent valve in which cooling water of an internal-combustion engine is available to flow, and an engine controller, the method comprising:

predicting whether or not the urea aqueous solution will be solidified when it is assumed that the internal-combustion engine is stopped in a period from when forced regeneration of the DPF is started to when it is ended or within a predetermined period from when it is ended; and notifying an operator of the internal-combustion engine when predicting that the urea aqueous solution will be solidified.

7. The method according to claim 6, wherein the engine controller predicts that the urea aqueous solution will be solidified after the internal-combustion engine is stopped.

8. The method according to claim 6, wherein the engine controller is configured to predict whether or not the urea aqueous solution will be solidified when it is assumed that the internal-combustion engine is stopped in a period from when forced regeneration of the DPF is started to when it is ended or within a predetermined period from when it is ended based on at least one of the group consisting of a temperature, temperature gradient and outside-air temperature of the reducing agent injection valve.

* * * * *